Patented Aug. 11, 1936

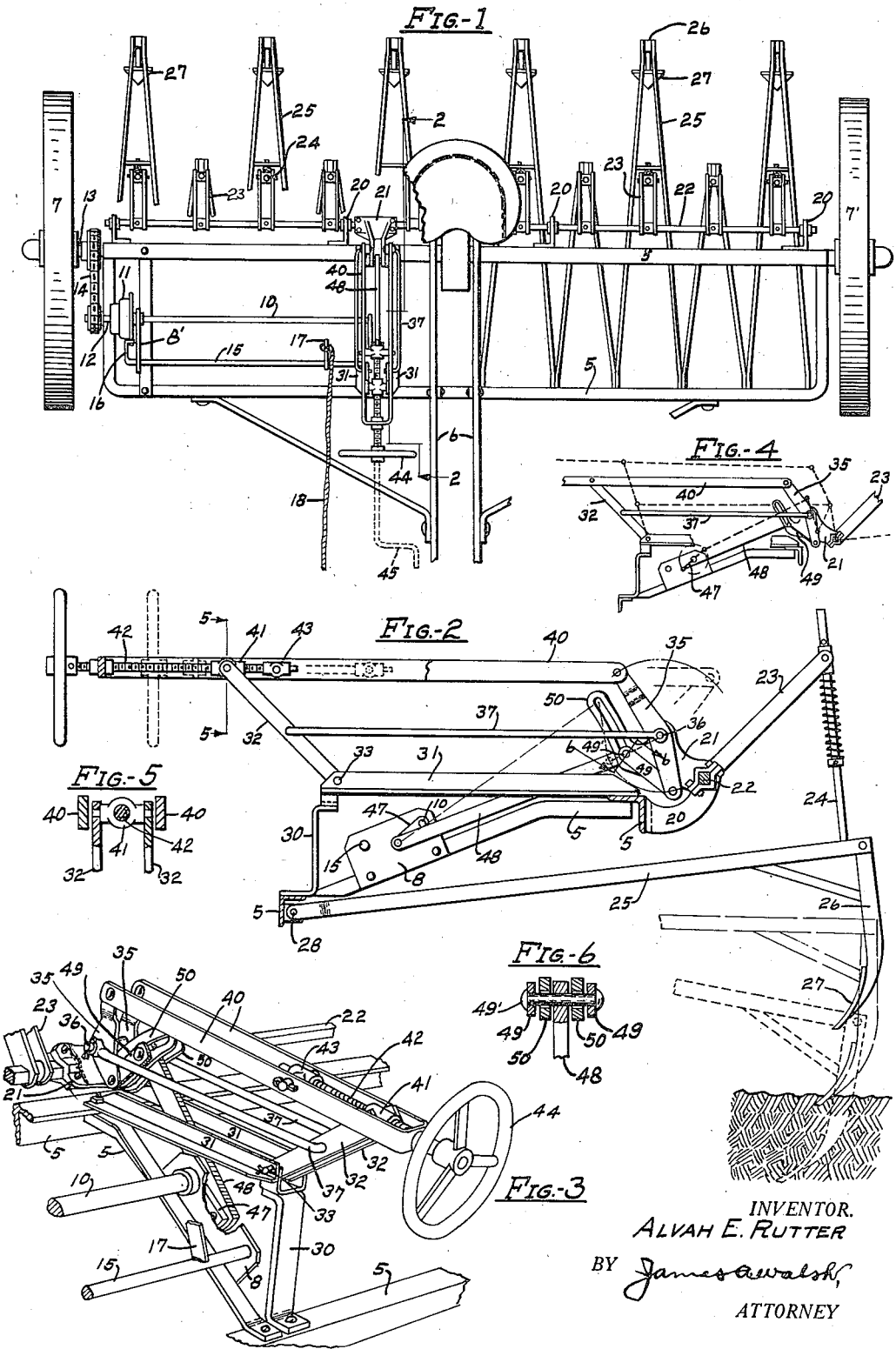

2,050,734

UNITED STATES PATENT OFFICE 2,050,734

FIELD TILLER

Alvah E. Rutter, Rockford, Ill., assignor to J. I. Case Company, Racine, Wis., a corporation Application July 8, 1935, Serial No. 30,295

6 Claims. (Cl. 97—157)

My present invention relates to field tillers designed to destroy weeds preparatory to cultivating and seeding operations, and consists in improvements whereby the earth working tools may be readily simultaneously adjusted for shallow or varied depth penetration and elevated to a maximum raised position above the earth surface regardless of the depth at which the shovels have been set for penetration, and which elevating operations when the tools have been adjusted as desired are accomplished in a simple manner by tripping a power-lift clutch under control of an operator.

In the accompanying drawing, forming part hereof, Figure 1 is a plan view of a field tiller embodying my improvements; Fig. 2, a side elevation taken on the dotted line 2—2 in Fig. 1; Fig. 3, a perspective of the adjusting devices as seen when looking toward the front of the implement; Fig. 4, a diagrammatic view indicating in full and dotted lines the positions assumed by certain connected elements shown in Fig. 2; Fig. 5, a detail sectional view taken on the dotted line 5—5 in Fig. 2; and Fig. 6 is a detail taken on the dotted line 6—6 in Fig. 2.

In said drawing the numeral 5 indicates the frame of the implement, to which is secured a draft member 6 adapted to be tractor or animal drawn as desired, the frame being mounted on wheels 7, 7', in any approved manner. In a bracket 8 secured to the frame I mount a shaft 10 on the outer end of which adjacent wheel 7 is a half-revolution clutch 11 of any suitable construction commonly employed in connection with implements, and which clutch includes a live shaft 12 connected to axle 13 by a sprocket-and-chain system 14 for actuating said shaft 12. Also mounted in bracket 8 and frame part 6' is a trip-rod 15 bent at its outer end, as at 16, to serve as a trip for the clutch 11, and which trip-rod is operable with a lever 17 and a pull rope 18 by a driver on the implement or the tractorman, according to the power employed for drawing the implement.

Upon the rear end of the frame, supported in bearings 20 and carrying a bracket 21, is a rockshaft 22 to which is secured a series of arms 23 for pivotally supporting spring-controlled rods 24 connected to drag-bars 25 carrying shanks 26 having earth working tools 27 at the ends thereof, and which bars are pivotally connected to the front frame member 5, at 28, as indicated in Fig. 2.

A supplemental frame is mounted on the main frame 5, comprising a standard 30 and horizontal members 31, to which latter inclined link supports 32 are pivotally connected, at 33. Bellcrank lever members 35 are connected, at 36, to opposite sides of bracket 21, and which levers and the support 32 are connected by links or connections 37. A yoke element 40 is pivotally secured to the upper ends of levers 35 and extends forwardly slightly in advance of support 32, which latter carries a trunnion 41 between the ends of its members, through the end of which yoke and the trunnion a screw 42 is positioned and extends into a bearing 43 between the yoke members, Fig. 3, the outer end of the screw being provided with a hand-wheel 44 for turning the same, or which may be operated by a crank 45 as desired.

The clutch shaft 10 extends through bracket 8 and is connected to a crank 47 which in turn is pivotally connected to a push-rod or connector 48, the opposite end of which rod is connected by links 49 to the lower end of bell-crank levers 35, and the upper ends of which rod and links at their juncture 49' are adapted to travel through slotted arms 50 forming part of bracket 21.

When the screw 42 has been adjusted as seen in Fig. 2, the inclined support 32, bell-cranks 35, yoke 40, push-rod 48, slotted arms 50, and other associated parts, are in the relation indicated by full lines, and the drag-bars 25 and tools 27 at their limit of elevation from the ground, from which position, by pulling upon lever 17, the clutch 11 will be tripped to turn a half revolution, which rotates shaft 10 to turn crank 47, causing push-rod 48 to move rearwardly and urging the forward part of bracket 21 in the same direction, which action rocks the shaft 22 to lower arms 23, and consequently the drag-bars 25, to the maximum depth of penetration shown in dotted lines, Fig. 2, and to cause yoke 40 and associated parts to assume the position indicated by dotted lines in Fig. 4. When the clutch is again tripped, its half revolution movement returns the parts described to the full line position, Fig. 2. When it is desired to cultivate at less depth the screw 42 is rotated, urging yoke 40 rearwardly, causing links 49 and rod 48 with the pivotal connection 49' to move upwardly a predetermined distance in the slotted arms 50 and so remain until the screw is again turned without affecting the drag-bars when in their elevated position as shown in dotted lines in Fig. 2. When the clutch is then tripped the tools will be lowered to occupy the dash-line position, Fig. 2, and when again tripped the drag-bars will be returned to their normal elevated position, so that regardless of the depth of the tool the drag-bars will always be returned to the position shown in Fig. 2. This is of importance, as the drag-bars and tools will be sustained well above the ground surface to avoid obstructions during transportation, which adjustment is not possible with implements of this character so far as I am aware, as the adjusting means for the drag-bars when the tools, for example, are but four inches below the surface and the adjustment has been regulated to a normal height of six inches, the tools, when elevated, will be but two inches above the surface, and when in the ground but one inch they will be elevated to five inches above the surface, whereas with my improvement, as stated, the drag-bars are always returned to the same maximum raised position upon tripping the clutch.

I claim as my invention:

1. In an implement of the class described, a wheel-supported frame, drag-bars pivotally mounted on the frame, a rock-shaft on the frame, a bracket on the shaft, arms connected to the rock-shaft, yielding means connecting the drag-bars and arms, a supplemental frame on the frame, a bell-crank on the bracket, a reciprocating element connected to the bell-crank and supplemental frame, a screw operatively supported on said element, means for actuating the screw to adjust the bell-crank and parts associated therewith, and means associated with and actuated by a source of power on the implement to turn the bracket and rock-shaft for raising and lowering the drag-bars.

2. In an implement of the class described, a wheel-supported main frame, drag-bars pivotally mounted on the frame, a rock-shaft on the frame, arms connected to said shaft, a bracket on the rock-shaft, means connecting the drag-bars and arms, a bell-crank on the bracket, screw controlled means for actuating the bell-crank to rock the bracket and rock-shaft for adjusting the drag-bars in relation to the earth, means for supporting said actuating means, and means operable by the implement for returning the drag-bars from lower adjusted position to normal elevated position.

3. In an implement of the class described, a main frame, drag-bars pivotally mounted on the frame, a rock-shaft on the frame, means connecting the drag-bars to the rock-shaft, a bracket on the rock-shaft including slotted arms, a bell-crank on the bracket, a reciprocating push-rod on the frame, a link connecting the bell-crank and push-rod, means in the slotted arms connecting the link and the end of the push-rod, means connected to the bell-crank for rocking the bracket and the rock-shaft and adjusting the connecting means in the slotted arms to position the drag-bars at variable distances from the earth, and means operable by the implement for returning the drag-bars from lower adjusted to normal elevated positions.

4. In an implement of the class described, a main frame, drag-bars pivotally connected to the frame and having earth working tools extending therefrom, bearings on the frame, a rock-shaft in the bearings, a bracket on the rock-shaft, a supplemental frame on the main frame, a bell-crank mounted on the bracket, a support on the supplemental frame, a link connecting the support and bell-crank, a yoke connected to the bell-crank and to the support, an adjusting device associated with the yoke, and means associated with said device for actuating the same to urge the yoke rearwardly to rock the bracket and rock-shaft for adjusting the drag-bars in relation to the earth.

5. In an implement of the class described, a frame, drag-bars pivotally connected to the frame and having earth working tools connected therewith, bearings on the frame, a rock-shaft in the bearings, means connecting the rock-shaft in the bearings, means connecting the rock-shaft and drag-bars for raising and lowering said drag-bars in response to rocking of said rock-shaft, a slotted bracket fixed with said rock-shaft, a power source on said implement, a connector reciprocably movable by said power source and engaged at one end in the slot of said bracket, a member pivoted on said bracket and connected to shift said connector to various positions in said slot, and an adjusting element supported from said frame, pivotally connected to said pivoted member and arranged to move with said bracket when said connector is shifted by said power source, but to be adjusted to various positions relatively to said bracket to actuate said pivoted member for changing the position of said connector in said slot, and accordingly the amount of movement of said bracket caused by said power source.

6. In an implement of the class described, a frame, drag-bars pivotally connected to the frame and having earth working tools connected therewith, bearings on the frame, a rock-shaft in the bearings, means connecting the rock-shaft and drag-bars for raising and lowering said drag-bars in response to rocking of said rock-shaft, a power source on the implement, a connector reciprocably movable by said power source and engaged at one end in the slot of said bracket, a support pivotally carried by said frame and spaced from said bracket, connections arranged to move said support in accordance with movements of said bracket and rock-shaft, a member pivoted on said bracket and connected to shift said connector in said slot upon such pivotal movement on said bracket, and an element carried on said support, connected with said pivoted member, and adjustable to move it relatively to said bracket, whereby movement of said connector by said power source will cause rocking of said bracket and support, and movement of said adjustable element without relative movement between said pivoted member and said bracket, and adjustment of said adjustable element will cause movement of said pivoted member relatively to said bracket, and shifting of said connector in said slot, and change the degree of movement of said bracket caused by reciprocation of said connector.

ALVAH E. RUTTER.